Nov. 2, 1965    F. H. HAMMOND, JR    3,214,971
TACK TESTING APPARATUS
Filed Oct. 30, 1962
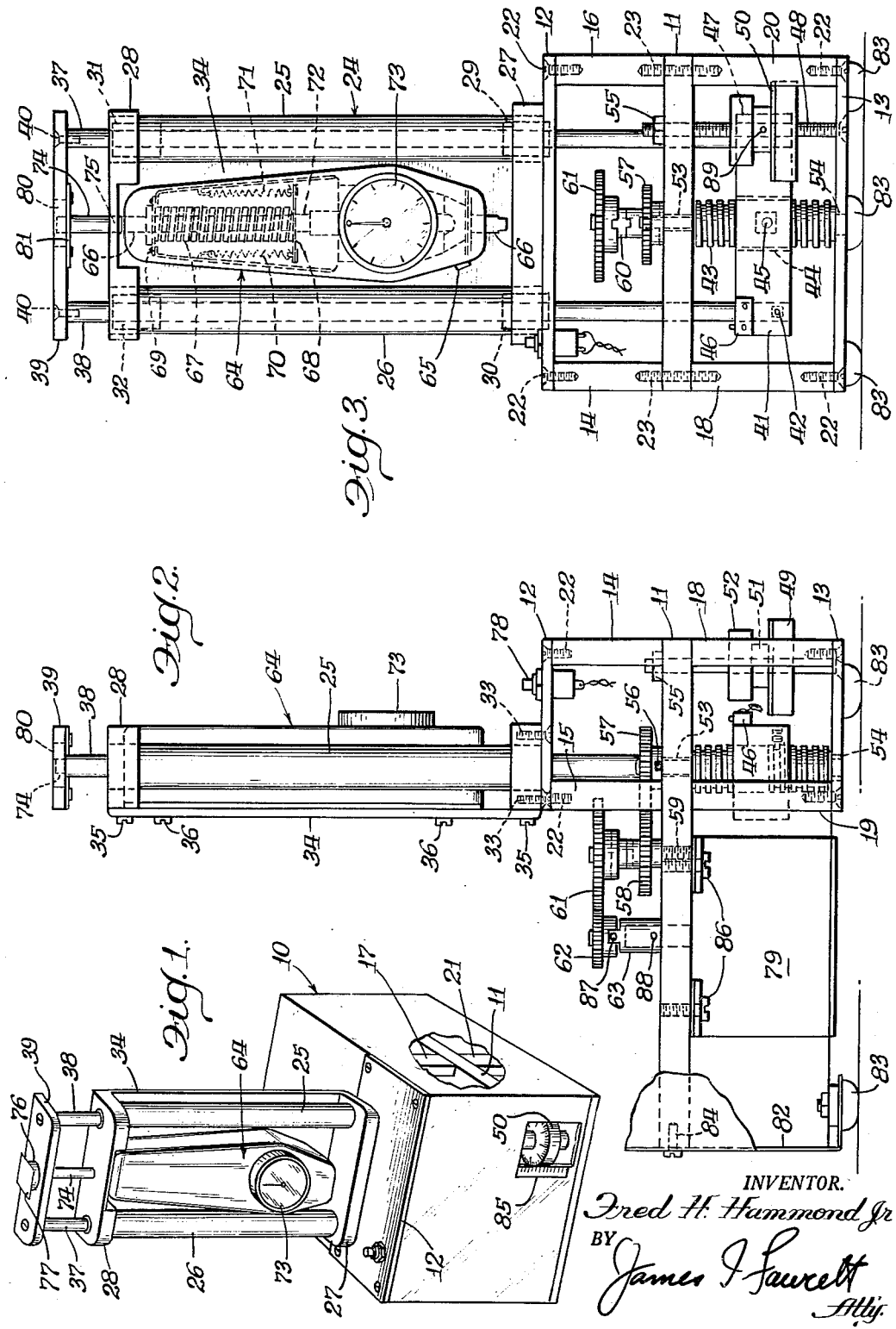
INVENTOR.
Fred H. Hammond Jr
BY James I. Fawcett
Atty.

United States Patent Office 3,214,971
Patented Nov. 2, 1965

3,214,971
TACK TESTING APPARATUS
Fred H. Hammond, Jr., Wellesley, Mass., assignor to The Kendall Company, Boston, Mass., a corporation of Massachusetts
Filed Oct. 30, 1962, Ser. No. 234,089
5 Claims. (Cl. 73—150)

This invention is concerned with a mechanism for measuring the tack of tacky surfaces regardless of the manner in which the tackiness is achieved and regardless of whether it is transitory or more or less permanent. Thus the mechanism is suitable for measuring the tack of materials including but not restricted to pressure sensitive adhesives, tacky solvent type cements, glues, coatings and adhesives, heat softened tacky thermoplastic coatings, glues, cements, resins and polymers, tacky printing inks and decorative coatings, tacky varnishes, lacquers, enamels, paints, putties, syrups, solutions, emulsions, pastes, doughs and plastisols and other tacky materials made tacky by degradation, depolymerization, partial or complete polymerization, interpolymerization or addition polymerization, by intermixtures of various materials such as resins, elastomers and polymers with tackifiers, or by chemical, physical or bacterial action. It is known that the ease with which and the extent to which such tacky materials form a bond with a contiguous surface depends on the chemical and physical nature of both the tacky materials and the surface, the pressure with which they are brought into contact, the length of time they are held in contact, the rate at which they are brought into and separated from contact, and the temperature and other surrounding conditions.

In the instruments of this invention, the end surface of one of a variety of probes is brought into simultaneous over-all, face-to-face contact with the tacky material surface under conditions whereby one of various definite contact pressures may be applied for one of various definite periods of time and whereby the probe may be withdrawn from contact in a direction perpendicular to its face at one of various uniform speeds of separation and whereby the maximum force necessary to break the tacky adhesive bonds may be measured as an indication of tack value of the tacky material under these selected conditions.

The instruments of this invention are designed to be used in constant environmental rooms where various conditions of temperature and humidity or special atmospheres may be maintained for preconditioning the tacky surfaces to be tested and/or for performing the actual tests, but obviously the instrument may be used with less effectiveness under ambient or other conditions, quite independently of special environmental rooms.

While other means for testing the tack value of tacky surfaces have been widely used, none of the previous apparatus has been so easy to use or so versatile and none has represented the tack values in more accurate or reproducible form. The apparatus of this invention is completely portable weighing in the presently preferred embodiment about 16 pounds and measuring about 9" x 15" x 16".

Referring to the drawings:

FIGURE 1 illustrates an isometric view of the assembled apparatus of the invention.

FIGURE 2 illustrates a side view of the apparatus of the invention with the cover panels removed.

FIGURE 3 illustrates a front view of the apparatus of the invention with the cover panels removed.

The preferred motive power for the instrument is a synchronous drive motor having a speed of 72 r.p.m. which speed eliminates the need for much gear reduction. This preferred motor has the desirable characteristics of starting, stopping, and reversing in about 25 milliseconds. Other drive devices may be utilized, however, such as a conventional synchronous or other motors with one or more electromagnetic clutches or cams.

Because the apparent tack of most tacky surfaces increases with increasing speeds of separation, it is highly desirable to provide a choice of speeds of separation in a tack testing machine. A choice of speeds of separation varying from .008" to 1" per second is available in the instrument of this invention by the use of pairs of change gears as will be fully explained hereinafter.

Contact pressures, as desired, may be applied by selection of a weight of proper mass, which during the operative cycle of the device is caused to be supported by a probe whereby the weight presses the exposed tacky surface against the probe tip. Normally, the tacky surface should be available on a backing or supporting substrate in small patches of sufficient size to cover the preferred annular weight over which the patches are stuck, face downward. This procedure exposes the tacky surface to the probe through the hole in the weight. With certain tacky coating materials, such as varnishes, however, it may be desirable to coat directly onto a flat weight which may be a portion of the substrate. The coating may be applied centrally or an over-all coating may be masked at the peripheral edges. Where dipping may be the preferred method of coating, it may be desirable to utilize a weight with a protruding flat center surrounded by a set-back flange. In most cases, however, it will be found both expedient and efficient to apply the tacky material onto a portion of its normal backing or substrate and utilize the preferred annular weights.

While the preferred method of applying the tacky surface to the probe tip with contact pressure is by utilizing weights which are supported by the probe, an alternative method is to utilize a graduated compression spring which is compressed as the probe is contacted. Similarly, one or more tension springs may be used for the same purpose.

Contact pressures normally may be applied in the range of .01 to 1 pound per square inch, the lighter pressures being obtained with hollowed-out weights. The contact pressure applied obviously is the mass in pounds of the weight and the applied tacky material and its backing or substrate divided by the probe tip area in square inches. When the tacky material is applied to heavy substrates such as those of metal, ceramics, thick wood, plaster, rigid plastics and the like, it is desirable to take the appreciable weight of the tacky material and its substrate into account. Where the tacky material is relatively thin and the backing, such as paper, cloth or films, is relatively light, these weights may usually be ignored since they contribute such a small portion of the total contact pressure, their effect on the tack is negligible. Most pressure sensitive adhesive tapes, for instance, are sufficiently light that a testing patch will add only about .01 pound per square inch contact pressure when the probe tip is a ¼ inch diameter circle.

Contact pressures as high 100 pounds per square inch are obtained by the use of supplementary weights.

The length of time the tip of the probe is in contact with the tacky material depends on the speed of separation but may be varied over a two hundred-fold range between .01 and 2 at the fastest speed and between 1.25 and 250 seconds at the slowest speed. However, by stopping the motor upon contact of the probe with the tacky material by means of an interval timer and then starting it in reverse at the end of the selected period, the period of applied contact pressure can be controlled independently of the rate of separation. Contact times in excess of a few seconds may be obtained by this method or by use of manual switches.

The temperature of the probe and tacky surface may be similar and may vary from −15° C. or much lower to 100° C. or much higher or the two may be different. Where the probe is heated above ambient temperature one may use resistance wire wound about the probe near the operative end which end may be insulated from the gauge. The tacky material may be preheated in an oven or on a hot plate while mounted on the selected annulus. Temperatures below normal room temperatures are best obtained in constant temperature rooms.

Referring once more to the drawings:

The device of the invention 10 is supported on feet 83, a central platform 11, a top platform 12, a bottom platform 13, and a back cover plate 82 having a bottom flange. The platforms are separated and supported by upper support posts 14, 15, 16 and 17, and lower support posts 18, 19, 20 and 21. Back cover plate 82 is fastened to central platform 11 by screws 84. The bottom and top platforms are fastened to the respective bottom and top support posts by means of screws 22. The central platform is fastened to the support posts by studs 23. Projecting upwardly from the top platform is the carrier frame and gauge mount 24. This mount consists of a carrier frame base 27, a carrier frame top 28, a carrier frame back 34, and two carrier frame posts 25 and 26, drive fitted into holes in the fame top and base. Bearings 29, 30, 31 and 32 provide carrier guideways for carrier rods 37 and 38. The carrier frame and gauge mount is fastened at its base to the top platform by means of screws 33. The carrier frame back is secured to the carrier frame base and top by screws 35. Carrier rods 37 and 38 are fastened by screws 40 to carrier top 39 and by set screws 42 to the carrier base 41. The carrier is caused to raise and lower by the rotation of lead screw 43 turning in bushings 53 and 54 set in the center and bottom platforms respectively. The external Acme threads of the lead screw number 6 per inch. These threads engage corresponding female threads of the lead nut 44, which nut is fastened to the carrier base by a set screw 45. Obviously, other means, such as crankshaft, rod and pin means, vertical cam and follower means, conical cam and follower means and similar devices for creating reciprocal motion may be substituted for the preferred lead screw and lead nut means to raise and lower the carrier. Fastened to the carrier base are upper limit switch 46 on one side and lower limit switch 47 on the other side. Extending between the bottom and central platforms is a bolt 48 held in place by the nut 55. The bolt 48 is threaded with 20 threads per inch. A timing knob 49 and a locknut 52 having female threads corresponding to the threads on the bolt 48 are threaded on the latter between the central and lower platforms. The locknut bears against the end of an upstanding cylindrical neck on the time adjusting knob 49. Loosely fitting around the neck of the adjusting knob are a time adjusting dial 50 and its locking collar 51. The dial may be adjusted to zero reading by turning it about the time adjusting knob neck. It is fastened to the latter by a set screw 89 in the locking collar 51. The dial normally lies on the upper surface of the adjusting knob with its dial face uppermost.

The shaft of the lead screw 43 projects through the central platform. A small pin 56 is drive fitted so as to project through the shaft and a short distance on either side thereof. A spur gear 57 fits over the shaft of the lead screw and a notch in the gear hub fits over the projecting ends of the pin 56. The gear 57 meshes with the spur gear 58 which spins on the idler shaft 59. The latter screws into center platform 11. The idler shaft also carries a coupling 60 which fits into a slot in the hub of gear 58 and also into a slot in the hub of spur gear 61 so that gears 58 and 61 turn at the same axial speed. Gear 61 in turn meshes with spur gear 62 which is mounted on a motor coupling 63. The latter is pinned to the motor shaft by pin 88. The motor 79 is suspended in its housing from platform 11 by screws 86. The motor coupling on its male shaft surface carries a pin 87 which projects through the coupling and a short distance on either side. This pin fits into a slot in the hub of gear 62. The gears are made in similar thicknesses with similar shaft holes and have similar slots in their hubs so that they fit the pins on the motor coupling and on the lead screw and also fit the coupling 60. The distance from the center line of the idler shaft to the center line of the lead screw shaft and to the center line of the motor coupling shaft is identical and all shafts which take gears are the same size so that the gears are completely interchangeable by pairs. The motor shaft travels at a speed of 72 r.p.m. Assuming gear 62 has 32 teeth and gear 61 has 160 teeth, the idler shaft turns at $$\frac{72 \times 32}{160} \text{ r.p.m. or } \frac{72 \times 32}{160 \times 60} \text{ r.p.s.}$$

Now assuming gear 58 has 32 teeth and gear 57 has 160 teeth, the lead screw shaft will turn at $$\frac{72 \times 32 \times 32}{160 \times 160 \times 60} \text{ r.p.s. or } \frac{6}{125} \text{ r.p.s.}$$

But the lead screw will raise the platform 1 inch in six turns since the screw has six threads to the inch. Hence, the platform will be raised 1 inch in 125 seconds or .008 inch per second.

By properly selecting gears in pairs, speeds of separation as indicated below are provided. C.S. indicates carrier speed of separation in inches per second.

| Gear Number | 57 | 58 | 61 | 62 | C.S. |
| --- | --- | --- | --- | --- | --- |
| Gear Teeth | 160 | 32 | 160 | 32 | .008 |
| Gear Teeth | 128 | 64 | 160 | 32 | .02 |
| Gear Teeth | 128 | 64 | 128 | 64 | .05 |
| Gear Teeth | 96 | 96 | 128 | 64 | .1 |
| Gear Teeth | 64 | 128 | 128 | 64 | .2 |
| Gear Teeth | 32 | 160 | 128 | 64 | .5 |
| Gear Teeth | 48 | 144 | 72 | 120 | 1 |

In place of the preferred stepped speeds, one obviously may substitute an infinitely variable speed change device, if that is desirable, although for most purposes such refinement in speed choices is seldom required.

The force necessary to separate the probe face from the tacky surface after contact therewith is measured by means of the force gauge 64. This gauge is secured to the carrier frame back by screws 36. The preferred gauge is one sold by the Hunter Spring Company, Lansdale, Pennsylvania, and illustrated and described in U.S. Patent No. 2,612,042, particularly the device shown in FIGURES 1 and 2 thereof. A suitable alternative gauge is the dial push/pull gauge sold by John Chatillon & Sons, 85 Cliff Street, New York 38, New York. While it is not essential, it is preferred to use a gauge with a simple button-controlled locking device with reset tab. With such a locking device the maximum force reading will be held by the pointer until released to zero by touching the reset tab. With control in off position, the indicator will follow the force fluctuation upward or downward. Force gauge 64 is shown with such a locking device having locking and reset button 65. As is set forth in the above-mentioned patent, a rod 66 extends from one end of the force gauge to the other, being supported at both ends by spring bearings. The rod is pinned to collar 68. Compression main spring 67 surrounds the rod and is held between collar 68 and plate 69, both of which are formed to prevent lateral movement of the main spring. The plate 69 is secured to the upper casing of the gauge. The main spring is normally under compression due to preloading springs 70 and 71, which are tension springs attached to the upper casing and the collar 68. The collar 68 also has an extension against which the contact point 72 of the dial constantly bears. As the collar 68 rises (which it does when the rod 66 rises thus compressing the main spring), the contact point 72 follows, moving a rack which rotates a gear producing pointer movement typical of the well-known rack and gear indicator. The dial face 73 is graduated into 10 major divisions of 100 grams each and each major division is graduated into 10 minor divisions of 10 grams each. Gauges may be obtained from 0–500 grams in 5 gram divisions or 0–2500 grams in 20 gram divisions or in pounds and ounces.

Mechanical force gauges of the type illustrated in the drawings and discussed above are preferred in the mechanisms of this invention. They are simple, reliable, sturdy, relatively compact, highly portable, independently complete, and respond to forces of very short duration. The force measurement may be made utilizing other methods and devices, however. One type of device might utilize a main spring and preloading springs as in the mechanical force gauge but replace the dial and pointer with an inductive, resistive or capacitive electromechanical transducer which would convert the movement of the rod 66 to electrical variation which in turn might be viewed on an oscillograph, actuate a graphic recorder or form the input to an averaging computer. As an example, the rod 66 may be attached to the core of a linear variable differential transformer whereby the output voltage from the transformer varies with the position of the core and the rod 66. This variation in voltage might actuate a galvanometer type graphich recorder whose tracing would be permanently recorded on a suitable chart or the variation might be viewed on an oscillograph.

But the mechanical force gauge also may be replaced by a load cell which would directly vary a voltage impressed thereon by the compressive force placed on the cell by the probe in pulling free of the tacky surface. Again the variation might be recorded on a graphic recorder or viewed on an oscillograph.

To obtain zero time of contact of the probe 74 with the tacky surface, a flat weight is placed upon an annulus 76 in the well 80. The time control knob 49 is then turned until the position is found at which the probe just touches the weight as the carrier descends at the moment the limit switch is actuated by contact with the top of the time knob to reverse the motor, actuate a relay, and raise the carrier. This point can be ascertained on the force gauge, when it is set so as not to hold its reading, by alternately lowering the carrier with the push button 78 and turning the timing knob until the position of the latter is found which, if it is turned to move down slightly, the gauge pointer will move slightly and, if it is turned to move up slightly, the hand will not move. The number of turns indicated on the scale 85 and the dial vernier 50 indicating partial turns may be set to read zero or the actual reading may be recorded as the zero reading. This position of the timing knob represents the exact time when the tacky surface is contacted by the probe as the former descends with the carrier adherent to an annulus. In order to permit the probe to support the annulus and its adherent adhesive patch, and thus apply the selected contact pressure for the selected time, the timing knob must be lowered from the zero position. The timing knob must turn 20 times to move one inch vertically. Actual time of contact in seconds is twice the vertical distance in inches the timing knob is lowered from the zero position, divided by the carrier speed in inches per second. Thus, it is apparent that the timing knob gives different times of contact between the tacky surface and the probe tip with each change in carrier speed.

One should refer to Table I in computing the proper setting of time adjusting knob. For instance, if the carrier speed (C.S.) is .5 inch per second and a time of contact of 4 seconds is desired, the adjusting knob 49 should be lowered from the zero setting (at which the probe face just touches the tacky surface when the motor is reversed by limit switch 47), a distance of one inch or twenty turns. The carrier will continue to depress after the probe has contacted the tacky surface for two seconds at .5 inch per second. At that point the limit switch 47 will reverse the motor being tripped by contact with knob 49, will actuate a relay, and the carrier will rise. After two additional seconds, the annulus is back resting on the plate 81 and the probe is no longer subject to the contact pressure caused by the annulus weight. Obviously, if the carrier speed were doubled the same time control setting would give a contact time of two seconds instead of four. Other contact times may be calculated in the same manner with the dial 50 acting as a vernier. The dial is divided into 10 divisions around its circumference, each division representing $\frac{1}{10}$ of a turn of the adjusting knob. These divisions may be subdivided, but in most cases such small increments of time will not be needed. An exception may be the case in which it is desired to measure the tack effect at incredibly short contact intervals.

Assuming he zero time adjustment has been made and the time of contact has been set, the proper probe 74 has been screwed onto the threaded end 75 of the gauge rod 66, an annulus 76 of proper weight to give the desired contact pressure has been selected, a gear train has been selected and installed to give the desired carrier speed (speed of separation), the device is ready to measure tack values in terms of grams of force necessary to separate the probe from the tacky surface. This force necessarily is dependent upon the area of contact of the probe face with the tacky surface. Probes with flat contact faces made from $\frac{1}{4}''$ rods are preferred, although the contact face may be of different size if desired. It is imperative that the tacky surface and the probe face be parallel if the results are to be reproducible. It is also desirable to have several annulae of the same thickness and with various size openings, so that the effects of various backings may be observed. With annulae whose holes barely permit passage of the probe, the backing appears to have little effect, whereas with larger openings the more elastic backings cause some variation in apparent tack values. The surface smoothness of the tacky surface has a tremendous effect; as is well known, the smoother the tacky surface, the higher the tack values. With rolls of pressure sensitive adhesive tape, the reverse side of the backing influences the adhesive surface and in many cases causes disruption of the adhesive as the tape is unrolled whereby at very light contact pressures only portions of the adhesive surface contact the probe. It may be desirable to explore this effect, however, and the machine of this invention is useful in such exploration. Such tests should be made immediately after the tape is unrolled, however, because many pressure-sensitive adhesives are subject to cold flow.

To make a test, the preliminary choices and adjustments having been made, a patch 77 of pressure-sensitive adhesive on its backing (or other tacky surface on its substrate) is adhered across the ole in the annulus and the annulus is placed in the well 80 in the carrier top 39 and resting on the apertured plate 81 which is fastened to the carrier top with screws. An annulus with an adhesive tape adhered across its hole is shown in FIGURE 1. To make the test, the button 78 is pressed causing the synchronous motor 79 to turn, thus causing the lead screw to turn through the gear train. As the lead screw turns, the carrier depresses until the probe face contacts the adhesive surface having passed through the plate 81, the carrier top and the annulus. As the carrier continues to depress, the annulus and its adhesive and backing are supported by the probe. Finally, the carrier depresses sufficiently that the button of the limit switch 47 strikes the time control knob 49 and thus actuates reversal of the synchronous motor 79. The gear train and the lead screw now turn in the reverse direction raising the carrier. The annulus eventually again rests in the bottom of the well 80 on the plate 81. At this point continued upward movement of the carrier tends to pull upward on the probe whose tip is stuck fast to the adhesive surface. As the probe and the attached gauge rod 66 rise, the contact point 72 of the gauge rises and thus turns the gauge pointer. Finally, the probe tip breaks away from the adhesive as the carrier continues to rise. The maximum force indication in grams is retained on the gauge due to the locking device. When the carrier has been raised by the motor to the point where the contact button of limit switch 46 touches platform 11, the motor is turned off and a relay is actuated so that when the button 78 is pressed, the motor will turn in the proper direction to lower the carrier once more.

The above description applies when it is desirable to raise and lower the carrier at the same speed. When it is desirable to raise the carrier at one speed and lower it at another this can be accomplished readily where the motive power is a synchronous motor, by changing the frequency of the electric current. Where the motor is a variable speed motor whose speed varies with the voltage a different voltage may be applied in lowering the carrier from that applied in raising it. The relay actuated by the lower and upper limit switches may be utilized to change from a current of one frequency or voltage to a current of another frequency or voltage.

As has been indicated, a variety of probes may be used with the device of this invention. The tip portion of the probe which comes into contact with the adhesive is, of course, the critical portion. Not only do different materials in the probe face cause different tack values with the same adhesive surface, but when different adhesives are tested first with one probe face and then with one of different material, the order of tack values may be changed so that one adhesive may have a higher tack value with one probe and a lower tack value with another. The relative smoothness of the tip is also important. Generally, the smoother a given probe tip is, the higher the tack value will be with a given adhesive. It is obvious, therefore, that a variety of probes in a range of materials and smoothnesses is desirable. In some cases it may be desirable to utilize a probe with a spherical, paraboloid of revolution, or other geometry in order to produce overall contact with tacky surfaces presenting the mating geometry or when used against flat tacky surfaces to introduce the effect of penetration of the probe into the tacky material, to change the geometry of stress at break, or to reduce the requirement of parallelism of tacky and probe surfaces that exists when using flat tipped probes. In other cases the probe surface may not be complete but may have sections removed such as is presented by the end of a tube or pattern engraved on the probe.

The probe including the tip may be made of a solid material, such as any of the metals, plastics, ceramics, glasses, woods or resins. Likewise, various sheet materials may be firmly adhered to the probe to form the contact tip. Sheet materials of films, papers, fabrics, minerals, membranes, woods and the like, may be utilized in this way for special testing purposes. In a similar fashion, the probe may be of treated metal, such as metal which is plated or anodized; or the probe may be coated with various film forming ingredients in solution or dipersions and the like, and afterwards dried, sintered or otherwise treated to produce an adherent dry coating on the probe. Likewise, the probe may act as a holder for a piece of material not easily molded or formed because of its crystalline or other physical or chemical nature. It may be desirable when studying the adhesive tackiness of certain adhesives to a particular surface to make special probes whose tips are constituted of the special surface.

The particular geometrical shape of the probe tip appears to be non-critical in that the tip does not appear to alter the order of tack values. It is most important, however, with flat tips that the surface of the probe tip be parallel to the adhesive surface on contact if meaningful results are to be obtained. Otherwise, the area of contact will vary with adhesives on different backings or substrates and with different film thicknesses of the adhesive on the same backing. In general, where probe tip materials are conductive to forming, a uniform area for the various contact probe tips is desirable. The prefered contact tips of the probes of this invention are circular in cross section and of ¼" diameter. Rods of ¼" diameter which can be readily converted into probes are generally available.

I claim:

1. A device for measuring adhesive tack values comprising a frame, a carrier, a force gauge including an attached probe, and an apertured selected weight, means for initiating a cycle wherein said carrier is lowered and automatically raised to its initial position at adjustably constant speeds relative to said frame and to said force gauge fixed to said frame, said gauge being actuated by extension of said probe, said probe being positioned to flatly contact, during the descent of said carrier, the adhesive surface of an adhesive tape covering the distal end of the aperture through said weight, said weight and tape being supported on said carrier prior to said contact but being freely supported by said probe after said contact while said carrier continues to lower, adjustable means controlling the commencement time of automatic ascent of said carrier and the time when said carrier has risen sufficiently to again support said weight, continued rising of said carrier causing extension of said probe until the adhesive bonds between said probe and said adhesive surface are broken, said gauge measuring the force exerted in breaking said bonds.

2. A device for measuring adhesive tack values comprising a supporting frame, a synchronous motor attached to said frame, a carrier moving vertically with respect to said frame, a vertical lead screw turning in bearings in said frame, a lead nut meshing with said lead screw and fixed to said carrier, an adjustable train of gears connecting said lead screw and said motor, rotation of said motor causing said carrier to ascend or descend at adjustable speeds, a limit switch limiting the extent of rise of said carrier by turning off said motor, a second limit switch reversing said motor and limiting the extent of depression of said carrier, means for adjusting the actuation point of said second switch and the extent of depression of said carrier, a force gauge having an upstanding rodlike member terminating in a flat faced probe, an annular selected weight carried by said carrier when seated thereon but supported freely by said probe when the latter is caused to adhere to an adhesive tape adhered face-downward over the distal hole of said weight as depression of said carrier causes said weight to descend when said motor is started, said motor being automatically reversed upon aotuation of said second switch causing said carrier to rise and again seating said annular weight, continued rise of said carrier causing said probe adherent to said adhesive tape to be pulled upwardly, the force of said upward pull registering progressively on said force gauge until the adhesive bonds between said tape and said probe are broken.

3. A device for measuring adhesive tack values comprising a supporting frame, a synchronous motor attached to said frame, a carrier including a top, a bottom and vertical rods fastened to said top and bottom, vertically aligned bearings in said frame, said vertical rods sliding in said bearings as said carrier moves vertically, an upright acme threaded lead screw including an abbreviated shaft portion at each end thereof, vertically aligned bearings in said frame in which said abbreviated shaft portions rotate, a lead nut meshing with said lead screw and constrained from turning by means fastening it to the bottom of said carrier, rotation of said lead screw causing said carrier to ascend and descend depending upon the direction of turning of said screw, an upright shaft of said synchronous motor, a first spur gear attached to turn with said shaft, a second spur gear meshing with said first gear, a third spur gear rotationally coupled to said second gear, a vertical spindle attached to said frame about which said second and third gears rotate, a fourth spur gear meshing with said third gear, said fourth gear being locked to a shaft portion of said lead screw, rotation of the shaft of said motor causing said first, second, third and fourth gears and said lead screw to rotate, raising or lowering said carrier at constant speed, said meshing spur gear pairs being readily interchangeable with other pairs whereby the constant speed of said carrier may be varied widely, a timing knob threaded on a vertical bolt attached to said frame whereby the vertical position of said knob is adjusted by turning the knob, two limit switches attached to said carrier, one with its switch button upward and acting to turn off said synchronous motor when said switch button is actuated by contact with said frame, the other limit switch, having a downwardly disposed button, acting to reverse said synchronous motor as the carrier descends to the point where the button of said other switch contacts said timing knob, a force gauge, fastened to said frame and including a main spring, a force indicating pointer, and a projecting rod-like member terminating in a flat-faced probe, extension of said member and probe causing compression of said main spring and movement of said pointer whereby the displacement of said pointer from the zero position indicates the force extending said probe, said carrier having a hole in the top, a selected annular weight seated centrally of said hole, said gauge and probe being so positioned that upon descent of said carrier, said probe projects into and through the hole in said carrier top and into the hole of said annular weight, said weight when the distal end of its hole is covered with an adherent downwardly facing pressure sensitive adhesive tape, being supported by said probe and said tape when the carrier is sufficiently depressed, the flat face of said probe being substantially parallel to said adhesive tape at the moment of their contact, electric switch means for initiating a cycle of said device whereby said synchronous motor is started in a direction to depress said carrier causing the probe of said force gauge to contact and adhere to the adhesive of the tape to be tested, further depression of the carrier causing the probe to freely support the adhesive and the adherent weight, said synchronous motor being automatically reversed as said carrier is depressed to the point where the switch button of said other limit switch contacts the timing knob, reversal of said motor causing said carrier to rise again seating said weight, said rod-like member of said force gauge being extended by the force of adhesion between said probe face and said pressure sensitive adhesive as the latter rises, said force gauge indicating said force of adhesion progressively as said probe is separated from said adhesive with continued rise of said carrier, contact between said one limit switch button and the frame stopping the motor and the carrier.

4. A device for measuring adhesive tack values comprising a probe having a test specimen contact surface; a force sensing means actuated by movement of said probe in response to a force acting thereupon; an apertured weight for attachment to a test specimen with a tacky test surface of said specimen exposed through the aperture of said weight, the size of said aperture being such to accommodate passage of the probe into the aperture at least to the extent of permitting adhesive engagement between the probe's contact surface and the specimen's test surface whereby the weight may be freely suspended upon said probe by reason of said engagement between said surfaces; a movable carrier upon which the apertured weight is positioned with the aperture therein in alignment with said probe; and drive means moving said carrier at a constant speed through a reversing cycle along the path of said alignment, said carrier carrying the apertured weight to the probe and freely suspending said weight upon said probe by means of the latter's adhesive engagement with a test specimen as aforedescribed, said carrier moving during the reverse travel of said cycle to again support said weight, to move said weight and the adhesively engaged probe and finally to separate the test specimen from said probe, said force sensing means measuring the force required for said separation.

5. A testing device in accordance with claim 4 including an adjustable timing means for controlling the commencement time of the reverse travel of said carrier after completion of the initial path of travel.

References Cited by the Examiner
UNITED STATES PATENTS

| | | | |
|---|---|---|---|
| 2,530,257 | 11/50 | Marcus | 73—150 |
| 2,752,780 | 7/56 | Gershberg | 73—150 |
| 2,775,888 | 1/57 | Pickup | 73—150 |
| 2,801,537 | 8/57 | Kabelitz | 73—150 X |
| 3,019,644 | 2/62 | Mancini | 73—150 |
| 3,129,586 | 4/64 | Allen et al. | 73—150 X |

LOUIS R. PRINCE, *Primary Examiner.*

DAVID SCHONBERG, RICHARD QUEISSER,
*Examiners.*